United States Patent
Dunlap

(10) Patent No.: US 8,393,449 B2
(45) Date of Patent: Mar. 12, 2013

(54) VARIABLE RATE LINKAGE FOR A BRAKE SYSTEM FOR A HANDLEBAR-STEERED VEHICLE

(75) Inventor: Charles E. Dunlap, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 147 days.

(21) Appl. No.: 13/178,183

(22) Filed: Jul. 7, 2011

(65) Prior Publication Data

US 2013/0008751 A1    Jan. 10, 2013

(51) Int. Cl.
*B60T 11/00* (2006.01)
(52) U.S. Cl. .................................... 188/344; 188/24.22
(58) Field of Classification Search ............. 188/24.12, 188/24.14, 24.19, 24.22, 344; 60/562, 588
See application file for complete search history.

(56) References Cited

U.S. PATENT DOCUMENTS

| 5,813,501 | A * | 9/1998 | Terry, Sr. ................. 188/344 |
| 6,804,961 | B2 * | 10/2004 | Lumpkin .................. 60/588 |
| 7,487,638 | B2 | 2/2009 | Tetsuka et al. |
| 7,832,531 | B2 * | 11/2010 | Hirose et al. ............. 188/344 |
| 7,942,250 | B2 * | 5/2011 | Watarai et al. ............ 188/344 |
| 8,201,670 | B2 * | 6/2012 | Tetsuka et al. ............ 188/344 |

* cited by examiner

*Primary Examiner* — Christopher Schwartz
(74) *Attorney, Agent, or Firm* — Milan Milosevic; Lisa Serdynski; Steven Courtright

(57) ABSTRACT

A brake actuation assembly for a hydraulic brake system of a handlebar-steered vehicle, the brake actuation assembly including a housing mountable to a handlebar of the vehicle and having a chamber formed therein. A piston assembly is received and axially guided within the chamber. A linkage is pivotally attached to the housing and the piston assembly and a lever blade is connected to the linkage to effect movement of the linkage, wherein movement of the linkage produces a variable rate of travel of the piston assembly relative to the travel of the lever blade.

21 Claims, 6 Drawing Sheets

VARIABLE RATE LINKAGE FOR A BRAKE SYSTEM FOR A HANDLEBAR-STEERED VEHICLE

BACKGROUND OF THE INVENTION

A hydraulic brake system for a bicycle typically includes a hydraulic brake actuation device, a rotor attached to a wheel of the bicycle and a brake caliper operatively connected to the brake actuation device. The caliper is responsive to changes in hydraulic pressure generated by the brake actuation device to urge brake pads into contact with the rotor and effect braking.

When the brake actuation device is initially actuated, no braking forces are generated because a gap must be closed between the brake pads and the rotor. Typical hydraulic brake systems that have a linear rate of travel of the piston relative to the travel of the lever blade require an undesirable amount of lever travel before braking occurs, i.e., a significant amount of "deadband." While most brake systems do not address deadband except to minimize the gap between the pad and rotor during set-up, there have been few efforts to develop mechanisms that close the gap quickly during lever actuation in order to minimize deadband.

There is a demand, therefore, to minimize deadband without the number of parts, weight and the expense of a complicated mechanism, and without degrading brake performance. The invention satisfies the demand with the additional benefits of lighter weight and reduced manufacturing cost.

SUMMARY OF THE INVENTION

The invention provides linkages for a brake system, for example, in a hydraulic brake system for a handlebar-steered vehicle. The invention relates to linkages for brake actuation systems for handlebar-steered vehicles and includes a variable rate linkage brake arrangement and lever preferably providing one or more of the following objects: 1) increased pad/brake surface gap, 2) increased end of stroke brake force, and 3) improved modulation and control.

The movement of the linkage according to an aspect of the invention creates a changing, i.e., variable lever blade stroke per piston actuation rate. This rate can be tuned to allow for greater initial fluid movement and subsequently increased pad/rotor clearance for the same lever blade stroke. The rate can also be tuned to have increased brake force at the end of the lever blade' stroke. Modulation and brake control can be tuned to a desired brake force in the beginning, middle, and ending ranges of the lever blade stroke with the advantage of increased brake performance. Tuning the linkage also preferably provides a reduction in eccentric piston loading.

Among other features, the invention may provide a variable lever pull/master piston actuation rate for increased end-of-stroke power, variable lever pull/master piston actuation rate for reduced initial brake force, variable lever pull/master piston actuation rate for greater fluid capacity for increasing pad/rotor clearance for the same lever stroke, variable lever pull/master piston actuation rate tuned to a desired brake force in the beginning, middle, and ending ranges of the lever blade stroke with the advantage of increased brake performance. The invention provides reduced complexity and part count over the prior art for reduced brake system weight and reduced complexity and part count over prior art for reduced manufacturing cost.

In a broad form the invention is generally directed to a brake actuation assembly for a hydraulic brake system of a handlebar-steered vehicle, the brake actuation assembly including a housing mountable to a handlebar of the vehicle and having a chamber formed therein. The chamber may be a fluid chamber. A piston assembly is received and axially guided within the chamber. A linkage is pivotally attached to the housing and the piston assembly and a lever blade is connected to the linkage to effect movement of the linkage, wherein movement of the linkage produces a variable rate of travel of the piston assembly relative to the travel of the lever blade.

In an alternate form, the brake actuation assembly may include a linkage with a fixed link pivotally attached to the housing, and a floating link pivotally attached to the fixed link at a floating link first end, wherein the piston assembly is pivotally attached to the floating link at a floating link second end.

These and other features and advantages of the present invention will be more fully understood from the following description of one or more embodiments of the invention, taken together with the accompanying drawings.

DETAILED DESCRIPTION OF THE PREFERRED EMBODIMENTS

Figure 1:
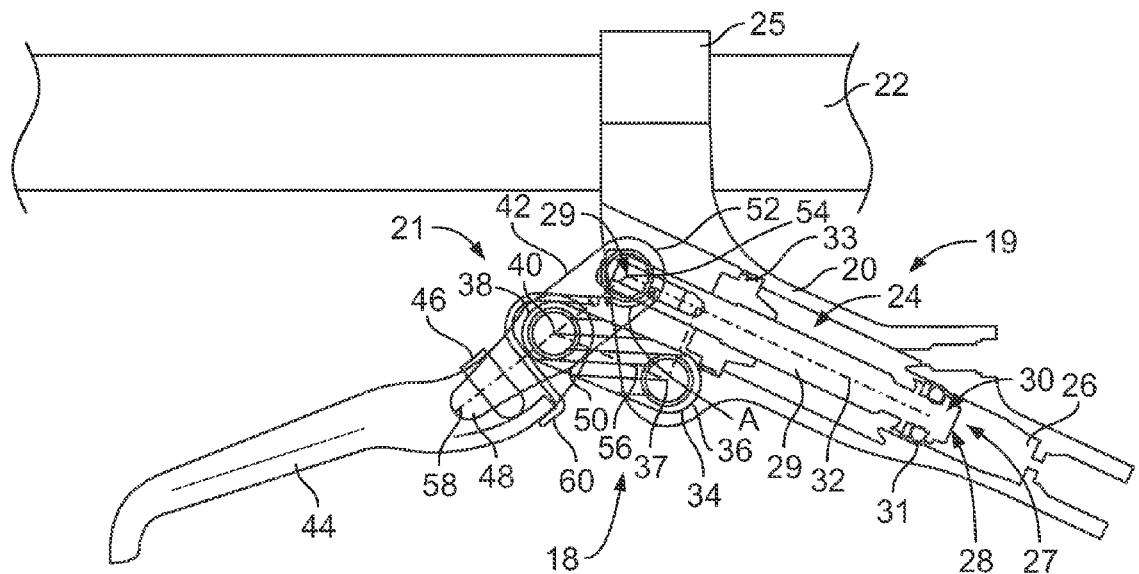
FIG. 1 shows a side cross-sectional representation of a brake actuation assembly according to an embodiment in a rest or start position.

Preferred embodiments of the invention will herein be described with reference to the drawings. It will be understood that the drawings and descriptions set out herein are provided for illustration only and are not for the purpose of limiting the invention as defined by the claims appended hereto and any and all their equivalents.

In the following, the construction of a brake actuation assembly is described, which according to an embodiment may be constructed or arranged to operate an otherwise conventional hydraulic brake system (not shown). In the described embodiment, in its most general form, the brake actuation assembly 18 for a handlebar-steered vehicle, such as a bicycle for example, includes a master cylinder assembly 19 and a linkage 21 constructed to operate the master cylinder assembly to produce a desired variable, i.e., non-linear, lever ratio, which will be described in detail hereinbelow. It will be understood that the described linkage, and the benefits thereof, could also be used in a non-hydraulic brake system, or on other types vehicles, such as, for example, motor-driven cycles and the like. The inventive system may be used on any type of hand operated brake for bicycles, motorcycles, three and four-wheelers, and automobiles. For bicycles, variations are possible for road style brake levers, different styles of mountain bike brake levers, BMX brake levers, all of which may be hydraulically or mechanically actuated. Other applications could include hydraulic or mechanical clutch systems.

Turning to FIGS. 1-3 and 5-9, the master cylinder assembly 19 includes a housing 20. A clamp element or elements 25 or any suitable fastening means may be part of or attached to the housing 20 for attaching the housing to a handlebar 22, for example.

The housing 20 may be any suitable shape that can define a hollow interior, such as chamber 24, and accommodate the mounting of and operation of the linkage 21. The chamber 24 preferably includes a fluid cavity or fluid chamber 26. The fluid cavity 26 includes brake fluid as is known and there is operatively associated with the housing some means for maintaining fluid pressure within the chamber, specifically the fluid cavity such as, for example, a bladder (see FIG. 10), or an equivalent mechanism. The housing 20 may be made of any suitable material, for example, metal, plastic, composite materials or combinations thereof.

A piston assembly 28 is at least partially disposed in the chamber 24 and fluid cavity 26. The piston assembly 28 may include a piston 30 positioned at one end thereof, e.g., at or near a distal end 27 of the assembly, which piston may be provided with one or more seal 31. The seal 31 sealingly engages the chamber 24 at predetermined positions within the fluid cavity 26 and reciprocates therein. The seal 31 may be an o-ring, for example.

The piston assembly 28 is constructed and positioned within the chamber to reciprocate along a piston assembly axis 32. The piston assembly 28 is preferably biased in an open position by a piston assembly biasing element 64, which may be a spring (see FIG. 9), such as the coil spring shown.

A guide member 33 is preferably positioned within the chamber 24 to provide lateral support to the piston assembly 28 and guide the motion of the assembly along the axis 32 within the chamber. The piston assembly 28 and piston 30 can be a single-piece as shown or formed as multiple pieces. In one example contemplated by the invention, the piston 30 may be a separate part of the assembly 28.

In a hydraulic system, the master cylinder assembly 19 will be connected to a remote slave cylinder (not shown) which operates the hydraulic brake system by a hydraulic line to effect the application of fluid pressure on a brake component such as a disc brake or the like in a known manner.

Figure 10:
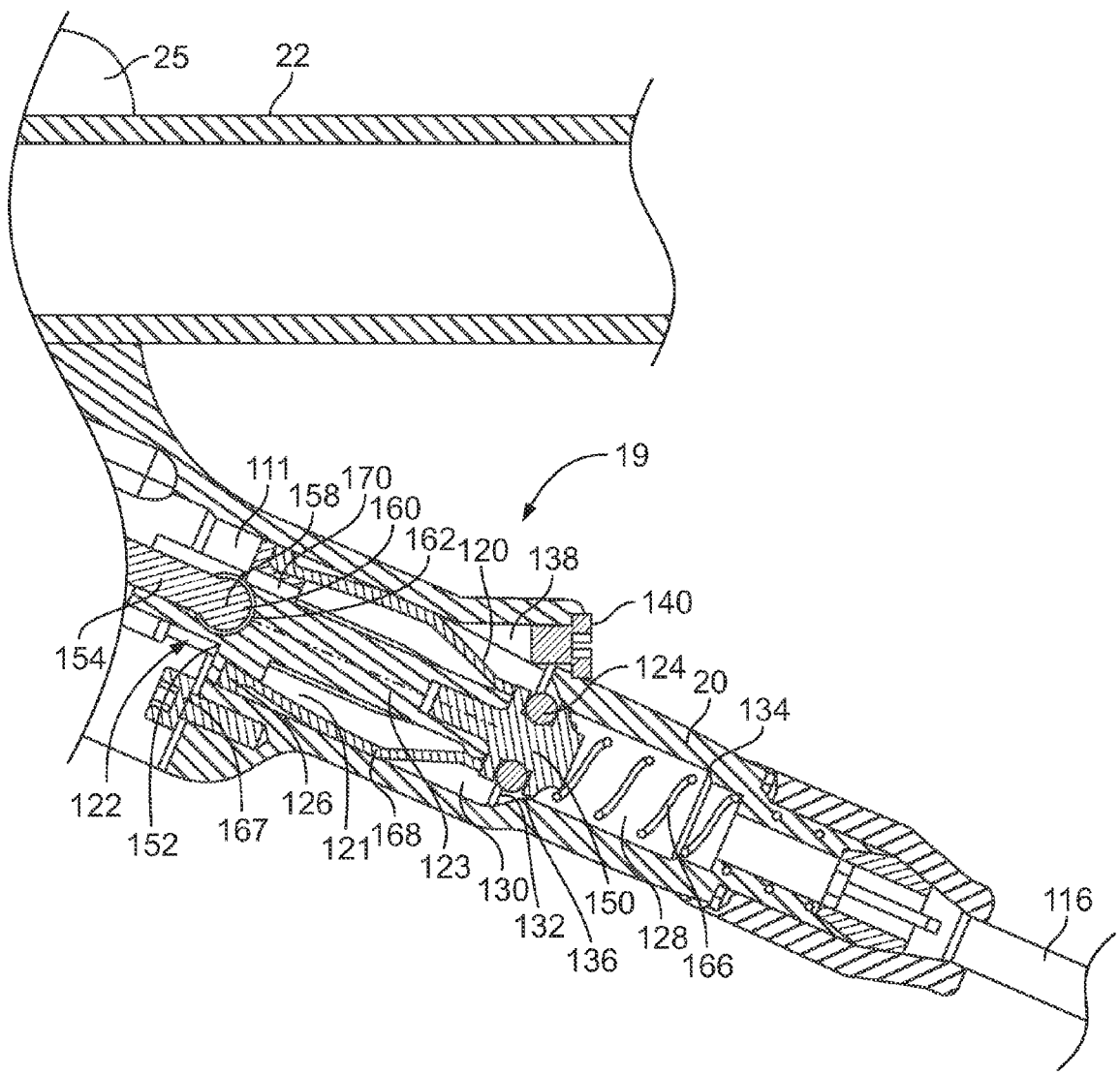
FIG. 10 shows a cross-sectional side view of a master cylinder assembly.

In order to more fully disclose how a master cylinder assembly operates, FIG. 10 shows a master cylinder assembly 10 for a hydraulic actuation system for a handlebar-steered vehicle according to one embodiment of the invention. The master cylinder assembly 19 includes a housing 20 mountable to a frame member of the handlebar-steered vehicle, in this embodiment to a handlebar 22, by a clamp 25. The master cylinder assembly 19 is operatively connected to a slave cylinder assembly (not shown) by a hydraulic line 116 to operate the hydraulic actuation system. In this embodiment, the master cylinder assembly 19 is designed to be used with a bicycle hydraulic brake system but may be adapted to be used with a clutch system. The master cylinder assembly 19 generally includes the housing 20, a fluid cavity 120, a piston assembly 122 and first and second seals 124, 126. The housing 20 includes a chamber 111 that includes the fluid cavity 120 and an air cavity 121. The fluid cavity 120 includes first and second regions 128, 130 and a tapered transitional region 132 therebetween. In the embodiment shown, the first fluid cavity region 128 has a smaller cross-sectional area than a cross-sectional area of the second fluid cavity region 130. One end 134 of the first region 128 is in fluid communication with the hydraulic line 116 and the other end 136 is adjacent the tapered transitional region 132 of the fluid cavity 120. In this embodiment, the transitional region 132 is tapered but may have a different shape or may be eliminated entirely, for example, by a stepped transition between first and second regions 128, 130. The first and second regions 128, 130, in this embodiment are cylindrical, however, the regions 128, 130 may form a variety of shapes. The housing 20 includes a fill hole 138 for filling the fluid cavity 120 with fluid. A screw 140 is threaded into the fill hole 138.

The piston assembly 122 includes a piston 123 that is slidably disposed within the fluid cavity 120 and has first and second portions 150, 152. The piston 123 is slidably displaceable between an open fluid circuit position (see FIG. 1) that permits fluid flow between the first and second fluid cavity regions 128, 130 and closed fluid circuit positions (now shown) that block fluid flow between the first and second fluid cavity regions. The first seal 124, in this embodiment an O-ring, is disposed on the first portion 150 of the piston 123 and the second seal 126 is disposed on the second portion 152 of the piston 123.

A pushrod 154 is connected to the second portion 152 of the piston 123. Thus, this illustrates an example of a piston assembly comprising more than one part. The pushrod 154 includes a head 158. The head 158 includes a ball surface 160 received in a corresponding cup surface 162 in the second portion 152 of the piston 123.

A coil spring 166 is disposed in the first fluid cavity 128 and is configured to abut the first portion 150 of the piston 123 to bias the piston toward the open fluid circuit position against a stop element 167. A flexible bladder 168 surrounds the piston 123. One end of the bladder 168 is attached to the first portion 150 of the piston 123 and the other end of the bladder 168 is attached to the second portion 152 of the piston 123. The flexible bladder 168 sealingly separates the air cavity 121 from the fluid cavity 120. The piston 123 includes a duct 170 to permit ambient venting of the air cavity 121. In this embodiment, the second seal 126 and the bladder 168 embody a single piece.

In FIG. 10, the first seal 124 is shown in non-sealing disengagement between the fluid cavity wall and the piston 123 in the open fluid circuit position to permit fluid flow between the first and second fluid cavity regions 128, 130. Advancing the piston 123 causes the system to seal and fluid is urged into and through line 116. The illustrated embodiment of FIG. 10 is referred to as an "open" system since fluid flow is permitted between the two regions 128, 130. The invention contemplates being applied to a "closed" system as well, where the piston 123 is kept in contact with the cavity wall and accordingly not permitted to unseal.

It will be understood that the invention also contemplates being applied to any suitable master cylinder such as the master cylinder as arranged and illustrated in U.S. Pat. No. 6,804,961; including a cylinder housing having a bar clamp at one end and a lever handle pivotably attached at an opposite end. The master cylinder housing, with what is sometimes referred to as a "backpack" reservoir, is hydraulically connected to a slave cylinder which operates a hydraulic caliper by a hydraulic line. The backpack reservoir has a reservoir chamber defined in a rear facing portion of the master cylinder housing. A cylinder wall defining in part the cylinder of the master cylinder housing extends into the reservoir chamber and defines in part a first wall. Extending through the cylinder wall between the reservoir chamber and the master cylinder is a timing port and a compensating port. A side wall extends from the first wall. A diaphragm made of an elastomeric material, such as silicon rubber, is made to overlay the side wall and cover the reservoir chamber. Thus, the first wall, the side wall and the diaphragm define the reservoir chamber.

The linkage 21, returning to the FIGS. 1-3 and 6-9, includes a fixed or first link 34, which is pivotally attached to a floating or second link 42, which is pivotally attached to the piston assembly 28.

The fixed link 34 is pivotally attached at a fixed link first end 36 to the housing 20 at a first point 37. The fixed link 34 is pivotally attached to the floating link 42.

The fixed link 34 is pivotally attached to the floating link 42 in one alternate version of the invention by a fixed link second end 38 being attached to a floating link central portion 50 at a second point 40. A floating link second end 52 is pivotally attached to the piston assembly 28 at or near a proximal end 29 of the piston assembly at a third point 54.

Each of the first, second and third points 37, 40, and 54 may be pivots in the form of a cylindrical member, and can be in the form of a pin, for example. It should be noted that only the first point 37, is motionless relative to the housing 20. The remaining points are urged into motion when the linkage 21 is caused to move. Bushings 62 may be disposed on the pivots 37, 40, and 54, or in a manner to function between the pivots and the part with which the pivots are associated, such as housing 20 or links 28, 34, 42, for example.

A lever blade 44 may be disposed on the second point 40 and biased by a spring 60 into a rest position as shown in FIG. 1. The lever blade 44 may be shaped to receive a floating link first end 48 in the form of an extension. The position of the lever blade 44 in the rest position may be adjusted to adapt to the reach of a user by an adjuster 46, which may be a threaded component, which is adjustably threaded through the floating link first end 48 and bears against a part of the lever blade 44 shaped and positioned to accommodate the adjuster. Other forms of adjusters are contemplated by the invention as is other forms of attachment of the lever.

Figure 5:
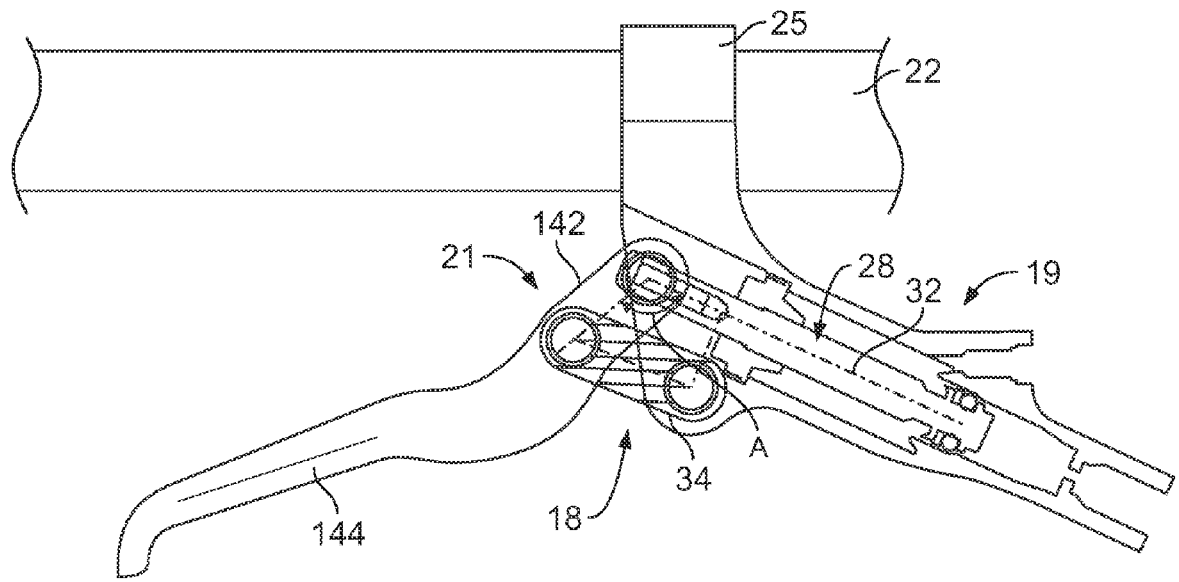
FIG. 5 shows a side cross-sectional representation of a brake actuation assembly according to the invention with a one-piece lever blade.
Figure 6:
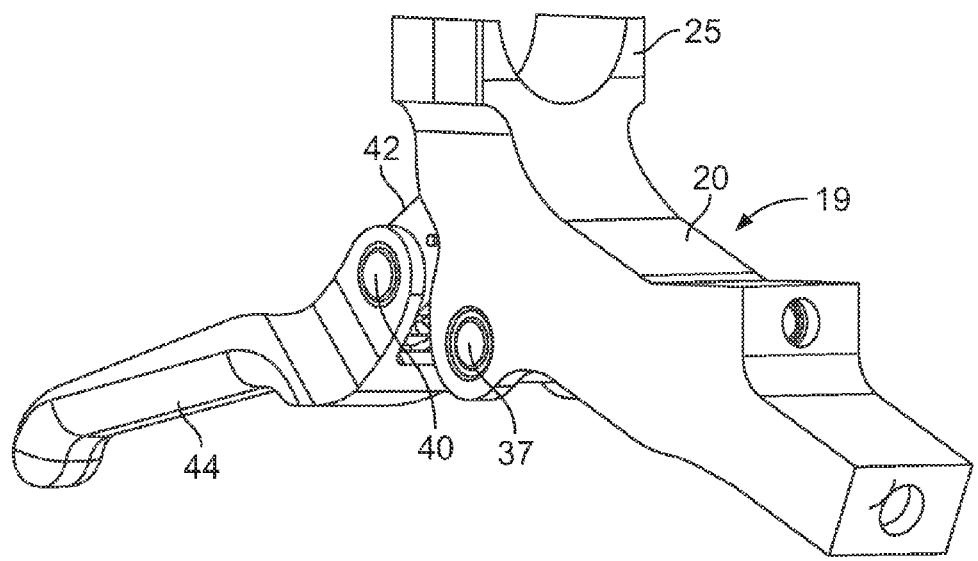
FIG. 6 shows a perspective view of the brake actuation assembly of FIG. 1.
Figure 7:
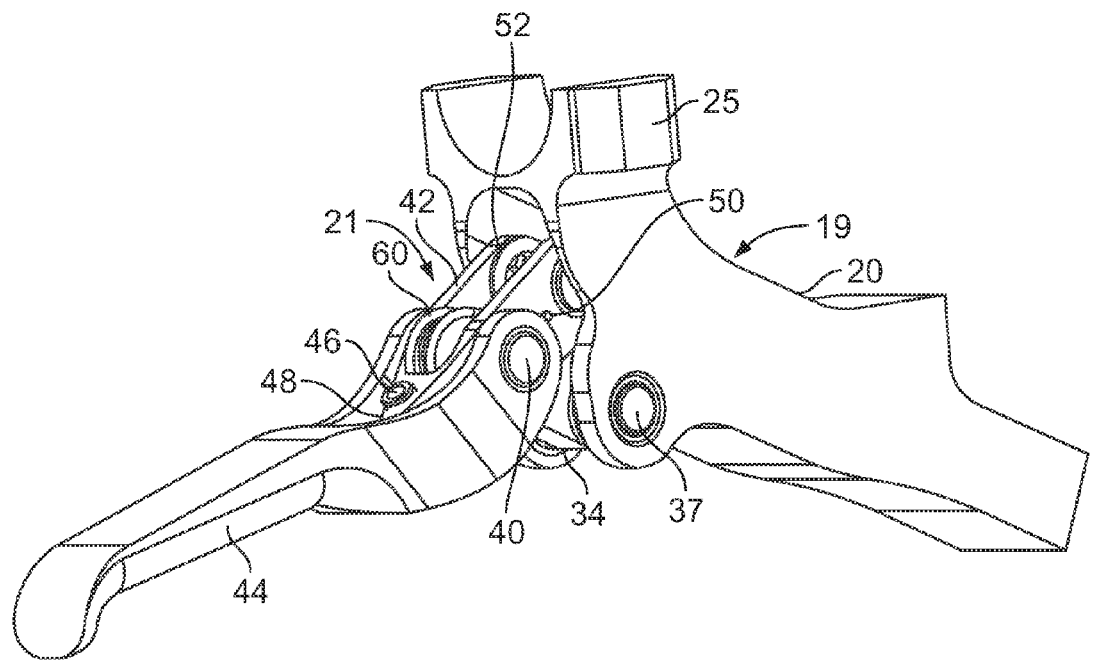
FIG. 7 shows another perspective view of the brake actuation assembly of FIG. 1.
Figure 8:
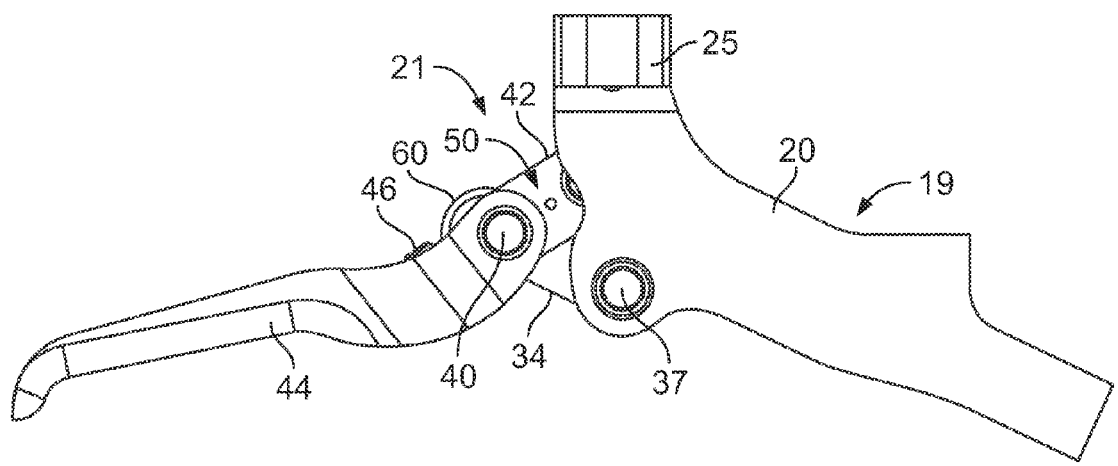
FIG. 8 shows a side view of the brake actuation assembly of FIG. 1.
Figure 9:
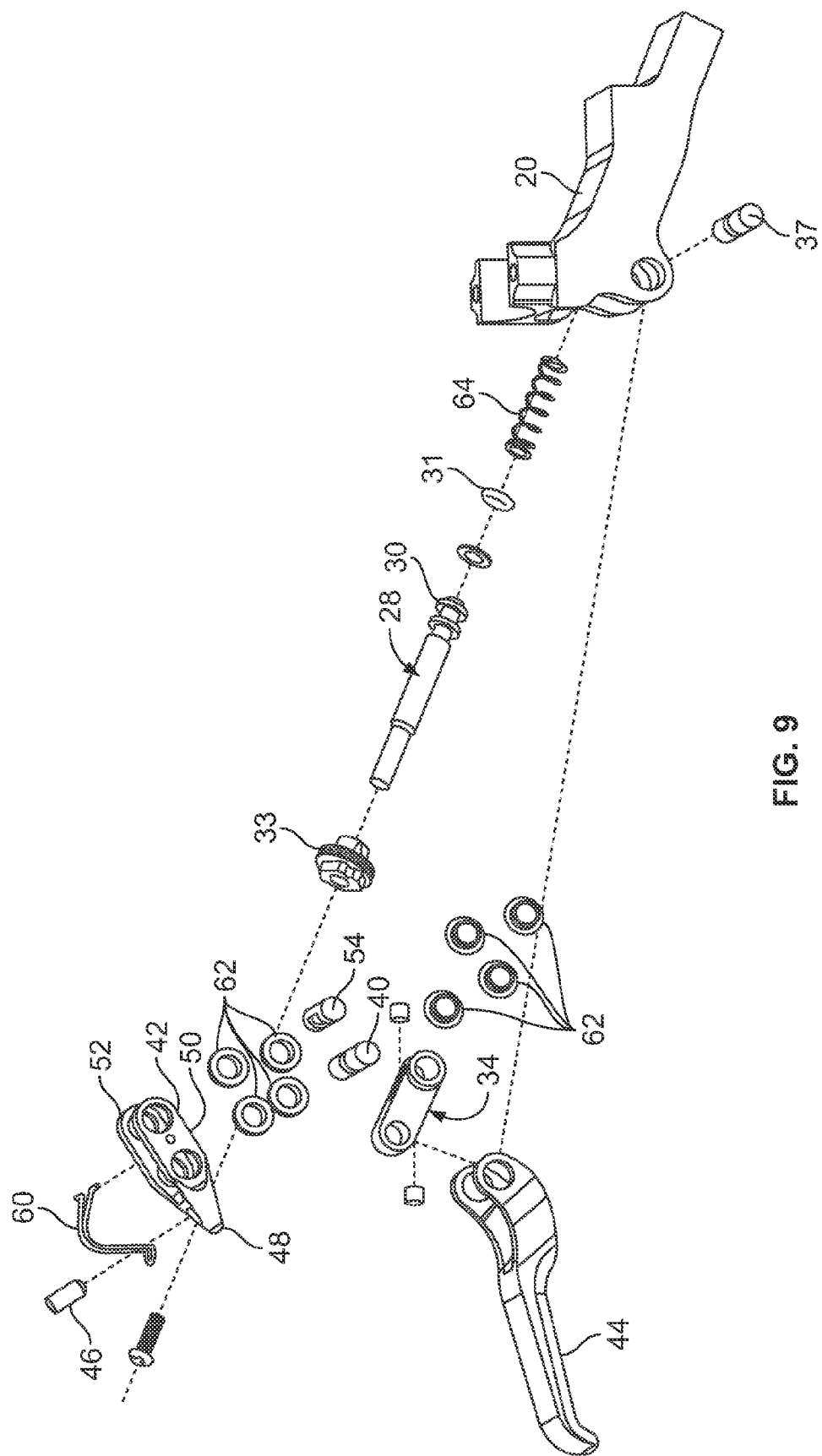
FIG. 9 shows an exploded perspective view of the brake actuation assembly of FIG. 1.

In the alternate, the lever blade 44 and the floating link 42 may be formed as a single piece, as shown in FIG. 5. In the embodiment of FIG. 5, the lever blade itself may be considered the floating link.

Returning to FIG. 1, which shows the brake actuation assembly 18 in a rest or start position, the piston assembly axis 32 and the fixed link axis 56 may preferably be arranged so as to be substantially parallel. For the purpose of the invention, the term "substantially parallel" in the context of the piston assembly axis 32 and the fixed link axis 56 refers to an angle that is within about 15 degrees of parallel, wherein preferably the reference axis is that of the piston assembly axis 32. More preferably, the piston assembly axis 32 and the fixed link axis 56 are arranged such that during travel of the lever blade 44, the axes 32, 56 stay within about 10 degrees of parallel.

It is believed that this orientation aids in the reduction of side loading of the piston assembly 28, especially with respect to the guide member 33, and produces the desirable rate of travel of the piston 30 relative to the travel of the lever blade 44. In addition, in the illustrated start position of the brake actuation assembly 18, the angle A between the floating link axis 58 and the piston assembly axis 32 is greater than about 90 degrees.

Figure 2:
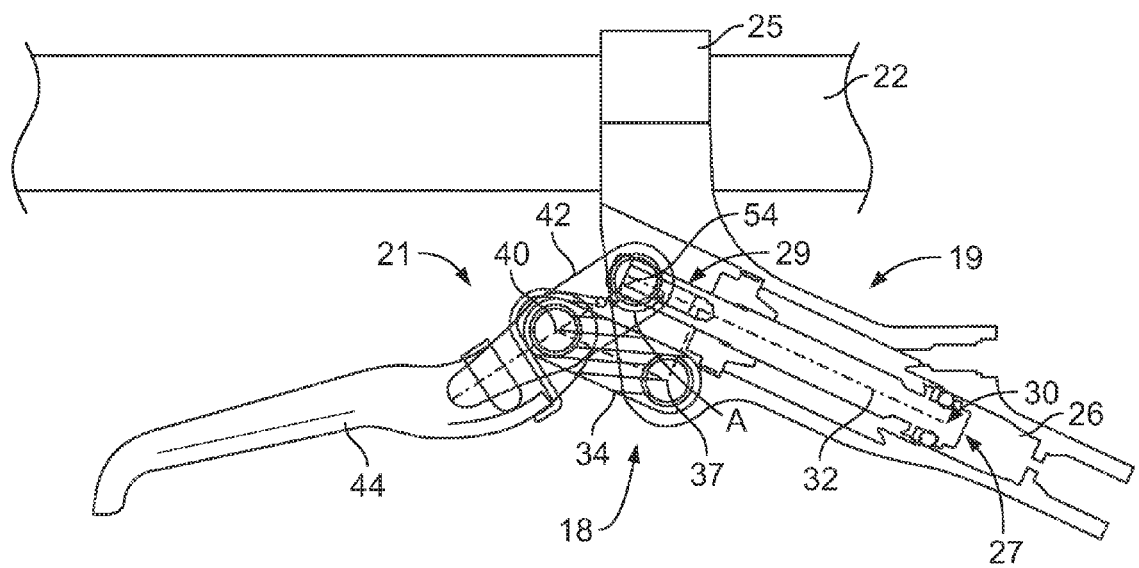
FIG. 2 shows the brake actuation assembly of FIG. 1 in an initialized or partially actuated position.
Figure 3:
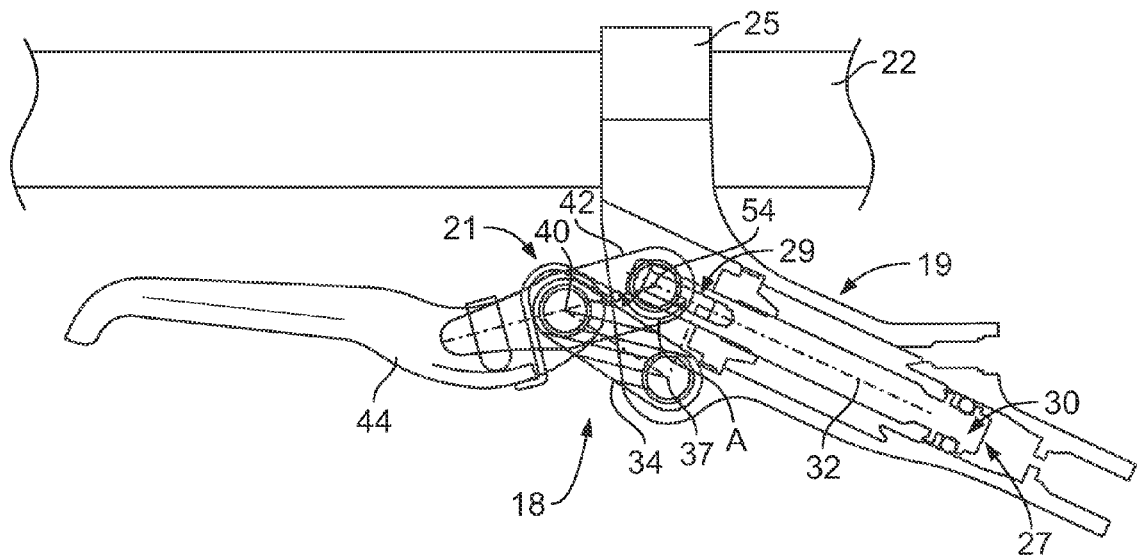
FIG. 3 shows the brake actuation assembly of FIG. 1 in an end or fully actuated position.

In operation, and referring to FIGS. 1-3, the brake actuation assembly 18 is respectively shown in a rest or start position (FIG. 1), an intermediate position or partial braking position (FIG. 2), and an end position or full braking position (FIG. 3). Of course, it will be understood that in the illustrated rest position the piston 30 is in a generally fully-retracted position within the chamber 24 and a maximum volume of fluid would reside within the fluid cavity 26, and thus the brakes would not be applied or engaged. In the intermediate position generally shown in FIG. 2, the piston 30 is shown in a closed condition with the chamber, and in FIG. 3, the piston is generating fluid pressure within the fluid cavity 26. Thus, in the condition shown in FIG. 2 or FIG. 3, some of the volume of fluid would tend to be discharged from the fluid cavity, and braking would be initiated or applied depending on the distance that the piston has traveled. In the position shown best in FIG. 3, the piston 30 is shown at or near a maximum extension or the end of its stroke and a maximum volume of the fluid within the fluid cavity 26 would be discharged from the fluid cavity, and thus a maximum braking force would be generated.

According to the arrangement of links shown, the angle A increases between the floating link axis 58 and the piston assembly axis 32 as the lever blade 44 (and thus, the floating link 42) moves from the rest to the end position. Specifically, the angle A preferably increases from an initial angle that is greater than about 90 degrees to an angle A' (FIG. 3) that is greater than the initial angle. As a result of the arrangement of links, the elements of the linkage 21 creates a variable or changing lever blade stroke relative to the piston actuation rate. Beneficially by altering the geometry of the links, this rate can be tuned to be initially higher than a conventional linear brake system and then, near the end of the lever blade stroke tuned to be at or lower than the rate of a conventional brake system. The variable rate linkage of the invention thus yields increased brake performance in accordance with a number of braking aspects.

At the same time as the angle A increases or opens, the fixed link second end 38, and thus second point 40 is drawn closer to the piston assembly axis 32. More particularly, it is believed that, and as a result of the geometry of the linkages, as the distance between the third point 54 and the first point 37 decreases the rate changes according to curve D in FIG. 4.

In a preferred embodiment, as the lever 44 is actuated, the second point may be drawn toward the piston assembly axis 32 the fixed link axis 56 first approaches parallel to the piston assembly axis, becomes parallel to the piston assembly axis, and then sweeps past parallel. This arrangement of axes reduces side loading to a minimum of the piston 30, especially with respect to the guide member 33, and produces the desirable rate D shown in FIG. 4.

Figure 4:
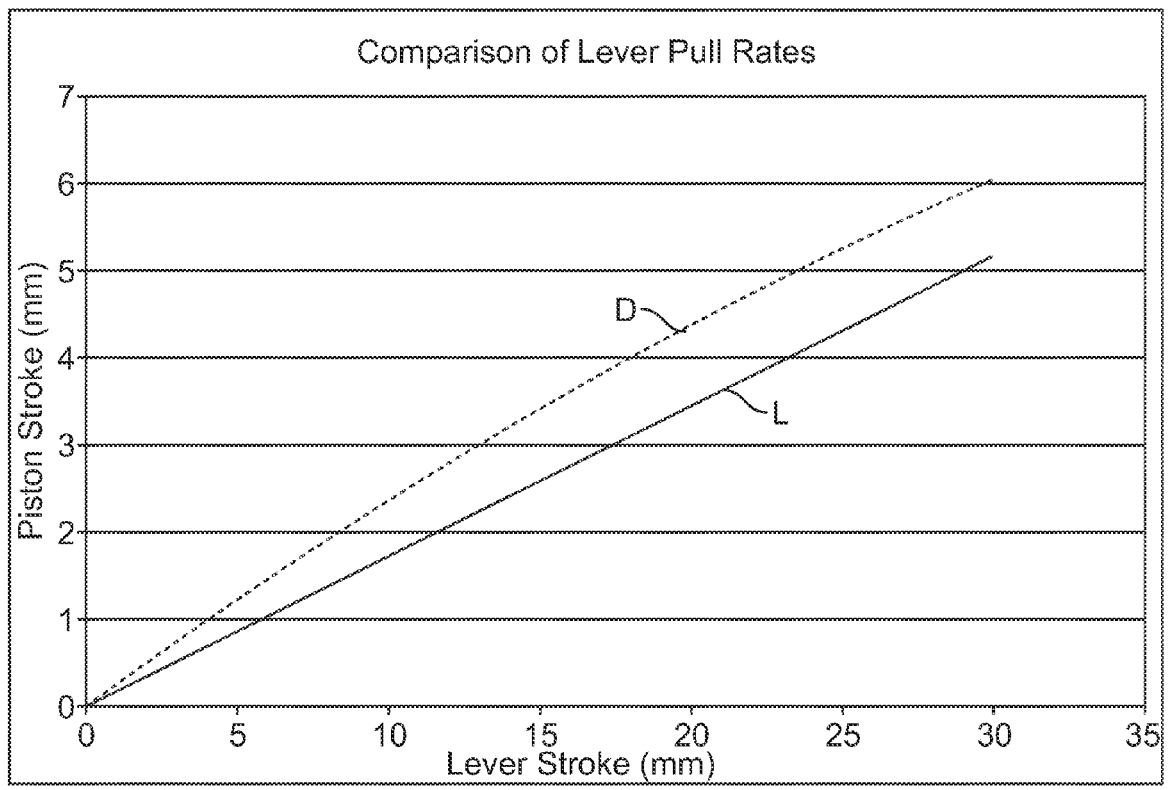
FIG. 4 shows a graph comparing a linear brake actuation curve according to a conventional brake actuation device and a non-linear curve generated by an embodiment of the invention.

Referring to FIG. 4, a graph is shown with two curves. Curve L is representative of a conventional brake system which generates a standard linear lever pull rate or ratio. According to curve L, the piston travels at a rate that is an essentially linear function of the travel of the brake lever blade. The rate or ratio is preferably defined as travel movement or stroke in a linear direction of the piston relative to movement of a fixed point on the lever blade moving radially towards the handlebar center axis.

In contrast to the linear curve L, curve D is representative of the linkage shown in FIGS. 1-3 and 5-9. According to curve D, which is a curve with a positive curvature, the piston travels at a rate that is shown as being initially greater than the piston of curve L. In other words, at or near the rest position the invention generates a relatively lower rate of lever blade displacement per piston stroke. Thus, upon initial brake lever actuation, the piston actuates at a maximum rate in the first stage of closing the fluid system and creating a seal within the master cylinder. This minimizes the "deadband," i.e., the amount of lever travel before brake pads contact the braking surface. After the system is "closed," the piston still moves large amounts of fluid as the brake pads contact the braking surface. After the brake pads contact the braking surface, the lever rate is higher yet and closer to a typical linear brake system. The result of this changing rate is a lever blade that "closes" the system within a relatively small lever blade stroke, advances the pads to a brake surface with a relatively small lever blade stroke, but then has enough lever rate at brake pad contact to provide the user the brake force and feedback that the user is accustomed to.

An additional benefit to the changing or variable rate system according to embodiments of the invention is a decreased initial brake/surface force that increases as the lever is further actuated. A brake system can thus be tuned to have less initial "bite" upon first contact of the pads to the brake surface, have moderate brake force through the mid-stroke, and then have the maximum brake force at higher user hand forces. This allows for greater control and predictability by the user.

FIG. 5 shows a brake actuation assembly 18 for a handlebar-steered vehicle, such as a bicycle for example, which includes a master cylinder assembly 19 and a linkage 21 constructed to operate the master cylinder assembly to produce a desired lever ratio. The master cylinder assembly 19 includes a piston assembly 28. A clamp element or elements 25 or any suitable fastening means may be part of or attached to the master cylinder assembly 19 for attachment to a handlebar 22, for example. The piston assembly 28 includes a piston assembly axis 32.

The linkage 21 includes a fixed or first link 34, which is similar or identical to that of the embodiment described above. A floating or second link 142 includes a lever blade portion 144. It can be seen that the floating link 142 is functionally the same as that described above; however, the lever blade 144 is formed as a portion or as a single, unitary piece with the floating link. Of course, in the illustrated form, the lever blade 144 will not have an adjustment capability as shown in FIG. 1. The floating link 142 connects the fixed link and the piston assembly 28, which piston assembly forms the third link of the linkage 21. It can be clearly seen that the lengthwise extent or longitudinal axis of the fixed link 34 is substantially parallel to the piston assembly axis 32. Accordingly, there is little or no side loading on the piston assembly 28 and, as in the above-discussed embodiment, the desired rate is generated by the linkage 21.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A brake actuation assembly for a hydraulic brake system of a handlebar-steered vehicle, the brake actuation assembly comprising:
   a housing mountable to a handlebar of the vehicle and having a chamber formed therein;
   a piston assembly received and axially guided within the chamber;
   a linkage pivotally attached to the housing and the piston assembly; and
   a lever blade connected to the linkage to effect movement of the linkage, wherein movement of the linkage produces a variable rate of travel of the piston assembly relative to the travel of the lever blade.

2. The brake actuation assembly of claim 1, wherein the linkage comprises a fixed link pivotally attached to the housing, and a floating link pivotally attached to the fixed link at a floating link first end, and wherein the piston assembly is pivotally attached to the floating link at a floating link second end.

3. The brake actuation assembly of claim 2, wherein the fixed link is pivotally attached to the housing at a first point and the first point is fixed in position relative to the housing.

4. The brake actuation assembly of claim 3, wherein the attachment of the floating link to the fixed link is at a second point.

5. The brake actuation assembly of claim 4, wherein the lever blade is attached to the linkage at the second point.

6. The brake actuation assembly of claim 5, wherein the piston assembly has a piston assembly axis, and the fixed link has a lengthwise extent extending between the first and second points, the lengthwise extent defining a fixed link axis, wherein the fixed link axis remains substantially parallel to the piston assembly axis throughout the travel movement of the lever blade during operation of the brake actuation assembly.

7. The brake actuation assembly of claim 6, wherein the fixed link axis becomes parallel to the piston assembly axis during the travel movement of the lever blade during operation of the brake actuation assembly.

8. The brake actuation assembly of claim 7, wherein the curve describing piston travel relative to lever travel has positive curvature.

9. The brake actuation assembly of claim 6, wherein the fixed link axis remains within 15 degrees of parallel to the piston assembly axis throughout the travel movement of the lever blade during operation of the brake actuation assembly.

10. The brake actuation assembly of claim 6, wherein the fixed link axis remains within 10 degrees of parallel to the piston assembly axis throughout the travel movement of the lever blade during operation of the brake actuation assembly.

11. The brake actuation assembly of claim 4, wherein the floating link is attached to one of at a proximal end of the piston assembly at a third point and near the proximal end of the piston assembly at the third point.

12. The brake actuation assembly of claim 11, wherein the piston assembly has a piston assembly axis, and the linkage includes a floating link having a lengthwise extent extending between the second and third points, the lengthwise extent defining a floating link axis, wherein the angle A between the floating link axis and the piston assembly axis is greater than about 90 degrees with the brake actuation assembly in a rest position.

13. The brake actuation assembly of claim 12, wherein the angle A between the floating link axis and the piston assembly axis is initially greater than about 90 degrees with the brake actuation assembly in a rest position and increases during the travel movement of the lever blade during operation of the brake actuation assembly.

14. The brake actuation assembly of claim 11, wherein the variable rate is a function of the distance between the third point and the first point.

15. The brake actuation assembly of claim 14, wherein the curve describing piston travel relative to lever travel has positive curvature.

16. The brake actuation assembly of claim 11, wherein the curve describing piston travel relative to lever travel has positive curvature.

17. The brake actuation assembly of claim 2, wherein the lever blade and the floating link are formed as separate pieces.

18. The brake actuation assembly of claim 17, wherein the lever blade is adjustable relative to the floating link.

19. The brake actuation assembly of claim 2, wherein the curve describing piston travel relative to lever travel has positive curvature.

20. The brake actuation assembly of claim 2, wherein the lever blade and the floating link are formed as a single-piece.

21. The brake actuation assembly of claim 1, wherein the chamber is a fluid chamber.

* * * * *